United States Patent
Oldcorn et al.

(10) Patent No.: US 12,079,919 B2
(45) Date of Patent: Sep. 3, 2024

(54) BOUNDING VOLUME HIERARCHY HAVING ORIENTED BOUNDING BOXES WITH QUANTIZED ROTATIONS

(71) Applicant: Advanced Micro Devices, Inc., Santa Clara, CA (US)

(72) Inventors: David Ronald Oldcorn, Milton Keynes (GB); Matthäus G. Chajdas, Munich (DE); Michael A. Kern, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/489,718

(22) Filed: Sep. 29, 2021

(65) Prior Publication Data

US 2023/0099806 A1    Mar. 30, 2023

(51) Int. Cl.
*G06T 15/06*    (2011.01)
*G06T 11/20*    (2006.01)

(52) U.S. Cl.
CPC .............. *G06T 15/06* (2013.01); *G06T 11/20* (2013.01); *G06T 2210/12* (2013.01)

(58) Field of Classification Search
None
See application file for complete search history.

(56) References Cited

U.S. PATENT DOCUMENTS

2019/0318445 A1* 10/2019 Benthin ................. G06T 1/20
2022/0020200 A1*  1/2022 Fenney ................ G06T 15/06

OTHER PUBLICATIONS

Schneider, P. J. & Eberly, D. H., "Oriented Bounding Box", Geometric Tools for Computer Graphics, Science Direct, 2003, 22 pgs., downloaded from: https://www.sciencedirect.com/topics/computer-science/oriented-bounding-box on Sep. 29, 2021.

* cited by examiner

*Primary Examiner* — Nurun Flora
(74) *Attorney, Agent, or Firm* — Volpe Koenig

(57) ABSTRACT

Described herein is a technique for performing operations for a bounding volume hierarchy. The techniques include: for a bounding box with quantized orientation, the bounding box being part of a bounding volume hierarchy, rotating a ray according to the quantized orientation to generate a rotated ray; performing an intersection test against the bounding box with the rotated ray; and according to the results of the intersection test, continuing traversal of the bounding volume hierarchy.

20 Claims, 7 Drawing Sheets

BOUNDING VOLUME HIERARCHY HAVING ORIENTED BOUNDING BOXES WITH QUANTIZED ROTATIONS

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Described herein is a technique for performing operations for a bounding volume hierarchy. The techniques include: for a bounding box with quantized orientation, the bounding box being part of a bounding volume hierarchy, rotating a ray according to the quantized orientation to generate a rotated ray; performing an intersection test against the bounding box with the rotated ray; and according to the results of the intersection test, continuing traversal of the bounding volume hierarchy.

Figure 1:
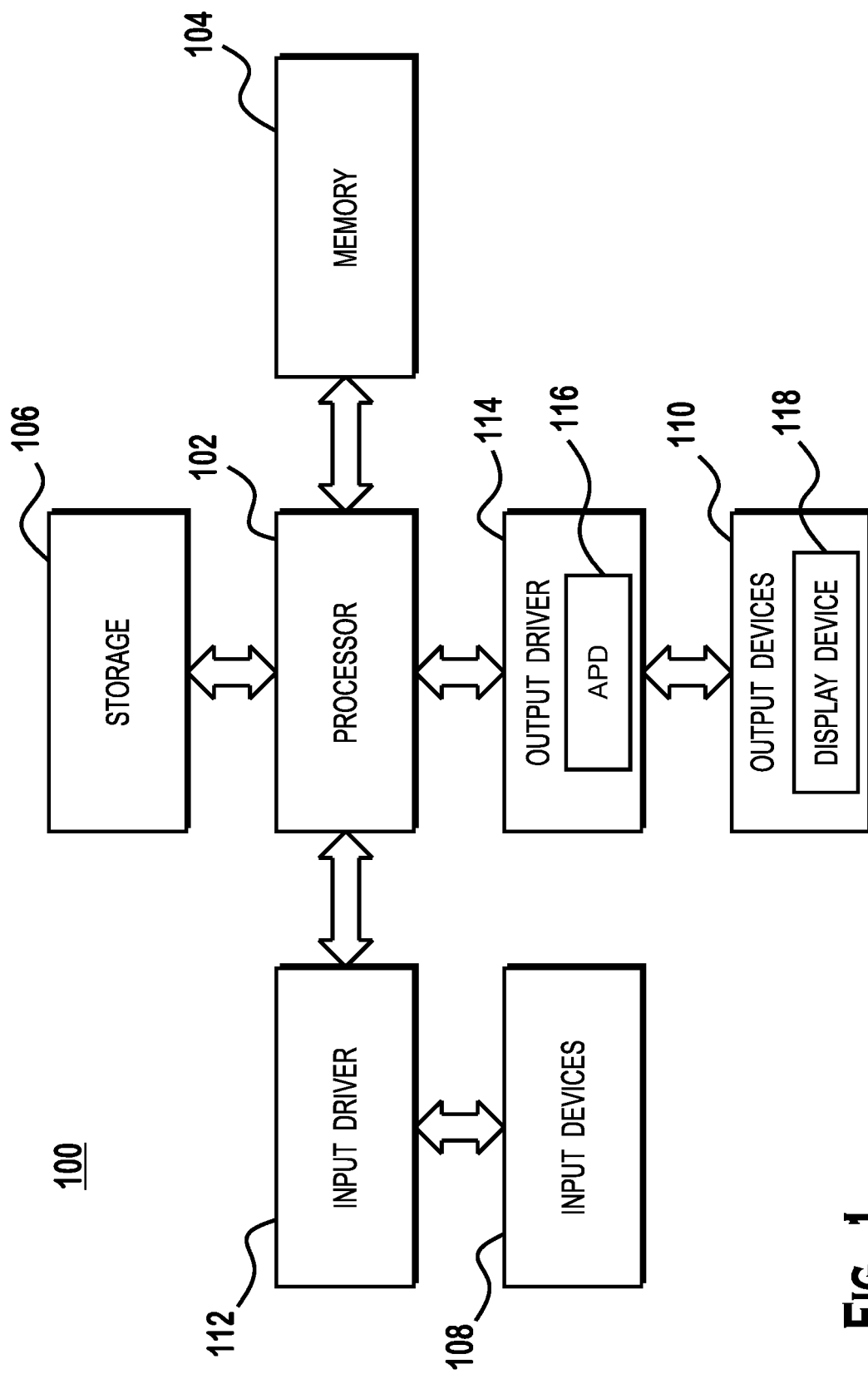
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
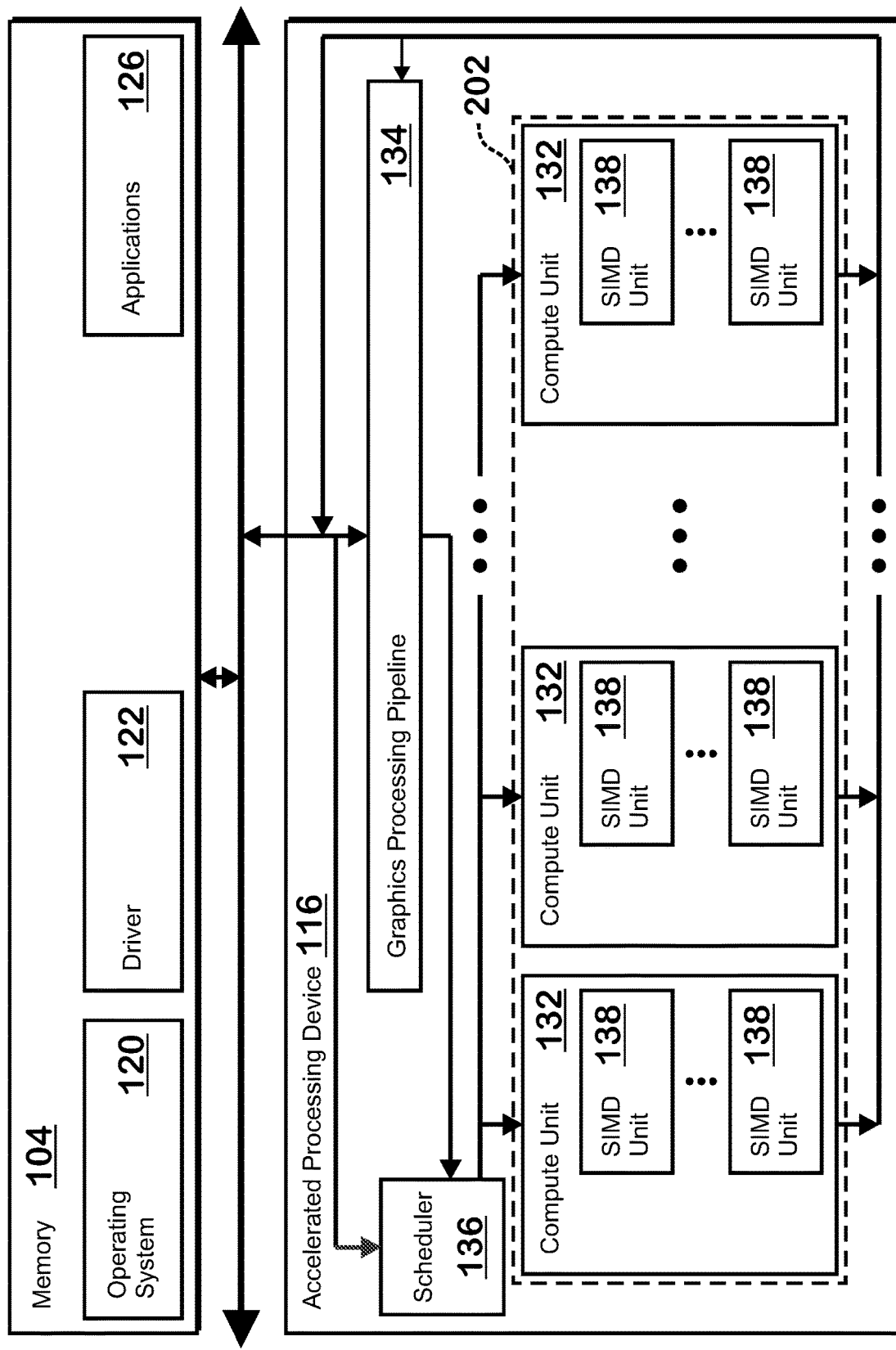
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" (also "waves") on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
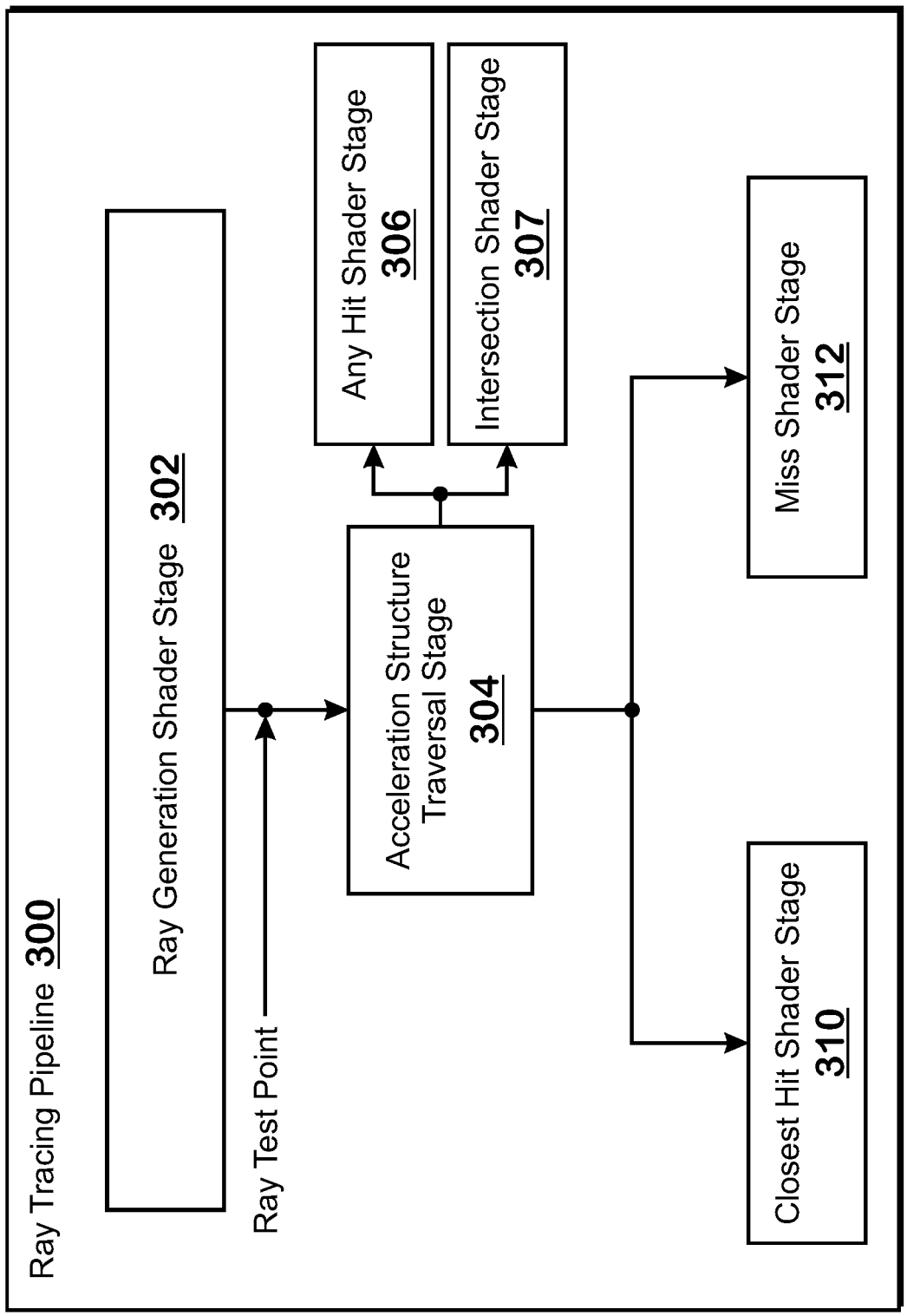
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage is implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 may "reject" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency may determine that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that the shader programs defined for the closest hit shader 310 and miss shader 312 may implement a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This bounding volume hierarchy is the "acceleration structure" referred to elsewhere herein. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray intersection test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
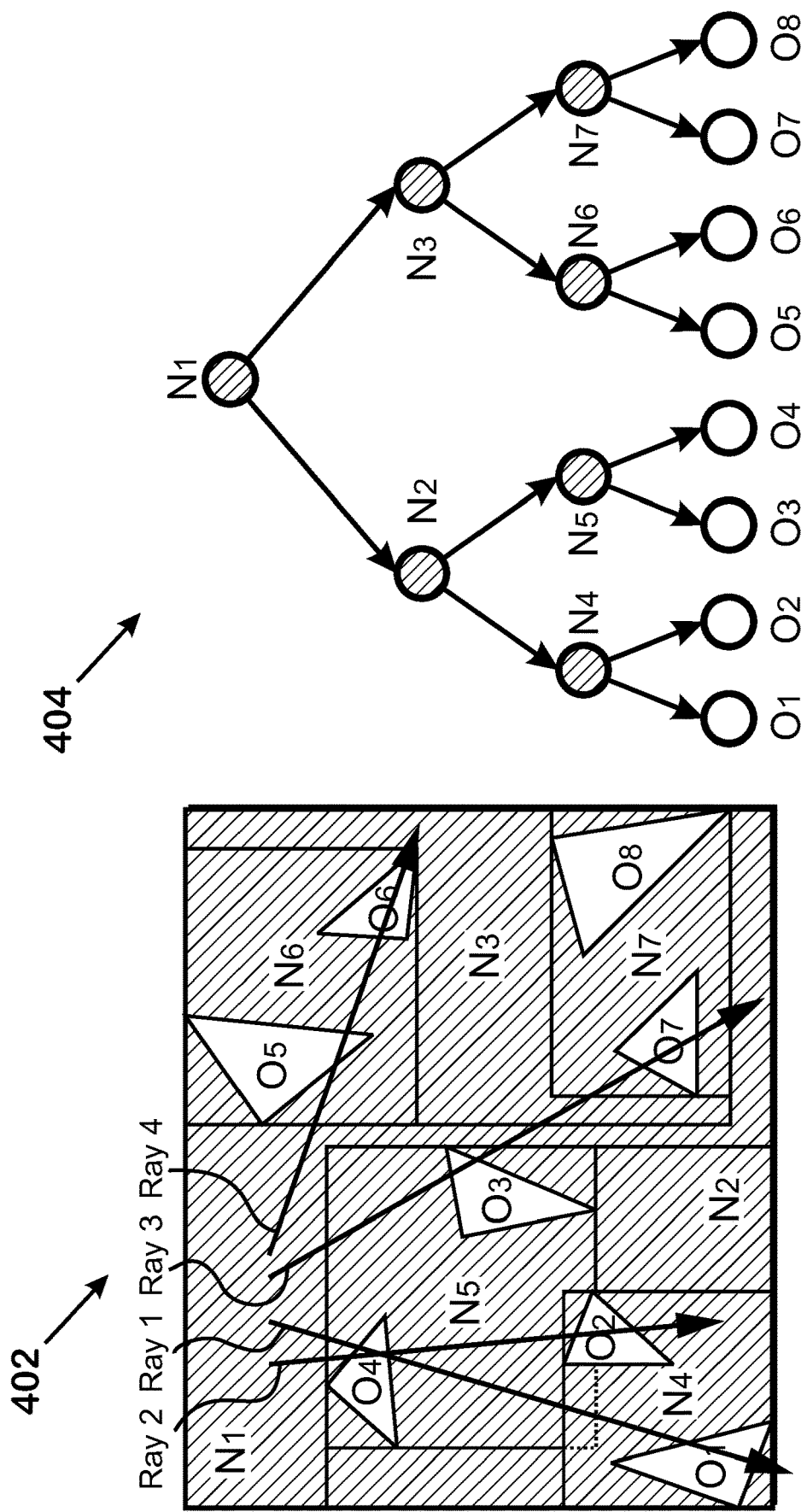
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the test for that non-leaf node fails. In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails Instead of testing 8 triangle tests, two triangle tests ($O_5$ and $O_6$) and five box tests ($N_1$, $N_2$, $N_3$, $N_6$, and $N_7$) are performed.

The ray tracing pipeline 300 casts rays to detect whether the rays hit triangles and how such hits should be shaded. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, the ray tracing pipeline 300 traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of the ray tracing pipeline 300 is now discussed with respect to the example rays 1-4 illustrated in FIG. 4. For each of the example rays 1-4, the ray tracing pipeline 300 determines which triangles those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for $O_4$ unless that triangle had an any hit shader or intersection shader that, when executed, indicated that ray 1 did not hit that triangle. In that situation, the ray tracing pipeline 300 would run the closest hit shader for $O_1$ unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with $O_2$ and $O_4$, executes an any hit and/or an intersection shader for those triangles if specified by the material, and runs the appropriate closest hit or miss shader. For rays 3 and 4, the ray tracing pipeline 300 determines intersections as shown (ray 3 intersects $O_3$ and $O_7$ and ray 4 intersects $O_5$ and $O_6$), executes appropriate any hit and an/or intersection shaders, and executes appropriate closest hit or miss shaders based on the results of the any hit and/or intersection shaders.

As stated elsewhere herein, a ray intersection test involves traversing an acceleration structure such as a bounding volume hierarchy. This traversal encounters bounding box nodes, which are nodes having associated bounding boxes that bound all the geometry of the children. To allow efficiency and simplicity in both box node representation in memory and during intersection test, bounding boxes are defined as being axis aligned. The intersection test is simplified in this situation because such bounding boxes are defined by sides having constant values in each dimension and there is no need to expend storage on axis alignment. However, axis-aligned bounding boxes have the drawback that poorly matching underling geometry will result in inefficiencies resulting from unnecessary additional bounding volume hierarchy traversal.

Figure 5:
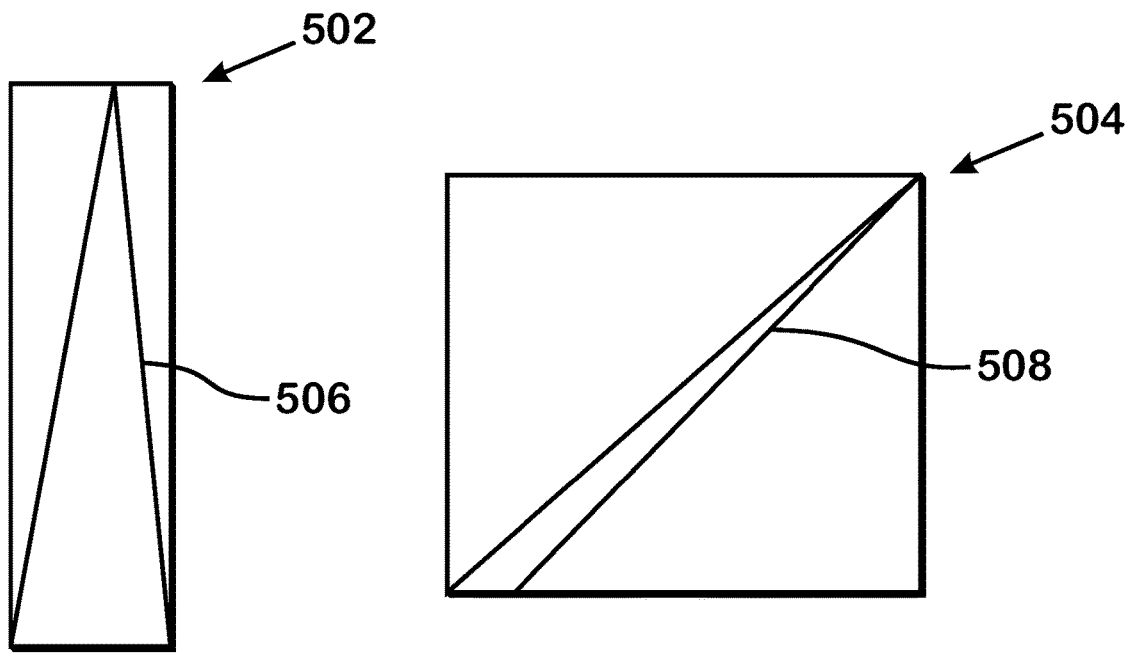
FIG. 5 is an illustration of a well-fit bounding box and a poorly-fit bounding box, according to an example.

FIG. 5 illustrates an example well-fit bounding box 502 and an example poorly-fit bounding box 504. A first triangle 506 is illustrated within the well-fit bounding box 502 and a second triangle 508 is illustrated within the poorly-fit bounding box 504. For clarity, note that in the figure, the illustrated second triangle 508 has bottom vertices that align with the bottom edge of the bounding box and thus the bottom edge of the triangle 508. The well-fit bounding box 502 is considered well-fit because a large amount of the space within the bounding box 502 is filled by the triangle 506 within that bounding box 502. By contrast, the poorly-fit bounding box 504 is considered poorly-fit because the triangle 508 within the bounding box 504 fills a very small amount of space of the bounding box 504. Poorly-fit bounding boxes can negatively impact performance because hits within poorly-fit bounding boxes that do not hit any underlying triangles are more common than hits within well-fit bounding boxes that do not hit any underlying triangles. The chance of a hit is directly related to the ratio of box volume to triangle surface area. Note that the two-dimensional diagram provided does not illustrate how much empty space there can be in a three-dimensional bounding box—there can be a much greater amount of such empty space in a three-dimensional bounding box. In addition, with a relatively large number of poorly fit bounding boxes, there is a greater chance that bounding boxes overlap (since bounding boxes must bound the interior geometry), which represents a degree of inefficiency. Hits within bounding boxes that do not hit any underlying triangles result in inefficiencies—it would be advantageous to stop traversal down a branch of a bounding volume hierarchy as early as possible if there are no triangles in that branch that are hit by the ray.

Poorly-fit bounding boxes can occur because the bounding boxes are axis-aligned. An improvement includes "orienting" the bounding boxes by rotating the bounding box and all geometry within the bounding box to improve fit. In various implementations, an oriented bounding box is embodied within a bounding volume hierarchy 404 as information including an orientation, as well as the bounds of the oriented bounding box. This orientation can be thought of as defining a rotated coordinate system that is rotated with respect to a global coordinate system (e.g., the coordinate system at the top node of the bounding volume hierarchy) in one or more axes, or is rotated with respect to some other coordinate system, such as the coordinate system of a parent node or in the case of a bottom-level acceleration structure, orientation that is rotated with respect to a top-level acceleration structure. Bottom-level and top-level acceleration structures are components of a two-level acceleration structure. A two-level acceleration structure includes a top-level acceleration structure and one or more bottom-level acceleration structures. One or more box nodes of the top-level acceleration structure point to one or more bottom-level acceleration structures, in lieu of the explicit data being included within the top-level acceleration structure. This scheme allows bottom-level acceleration structures to be "instanced," which reduces the total amount of data that needs to be stored in the two-level acceleration structure.

More specifically, by allowing nodes of the top-level acceleration structures to include pointers to bottom-level acceleration structures, the data of those bottom-level acceleration structures can be represented in the two-level acceleration structure twice without actually including the data twice. Traversal through the two-level acceleration structure would occur by following a pointer from a box node of a top-level acceleration structure to bottom-level acceleration structures when those pointers occur and where the intersection test for the box node succeeds. By allowing for the option to use oriented bounding boxes, bounding boxes can be better fit to badly rotated geometry, improving performance.

In operation, as the acceleration structure traversal stage 304 traverses the bounding volume hierarchy, if an oriented bounding box is encountered, the acceleration structure traversal stage 304 rotates the ray to be in the coordinate system of the oriented bounding box and performs the bounding box test for the ray against the box. In some implementations, rotation "accumulates" if multiple oriented bounding boxes exist in the same ancestor chain during traversal. In one example, an oriented bounding box is encountered which results in the acceleration structure traversal stage 304 rotating the ray. A test against that oriented bounding box indicates a hit. Subsequently, the acceleration structure traversal stage 304 encounters a child of that oriented bounding box which is further rotated. The acceleration structure traversal stage 304 further rotates the ray based on the rotation of this child object. In other implementations, each bounding box that is an oriented bounding box has orientation information that represents orientation with respect to world coordinates or with respect to the orientation of the base of the bounding volume hierarchy.

While a bounding box orientation expressed as three floating point numbers each defining rotation in a different one of three dimensions, can improve some aspects of performance, such an implementation introduces costs. Specifically, each orientation requires a certain amount of data to specify the rotation in each angle. If the rotation is represented, for example, as a 32-bit floating point number, the additional data required for three such values for a bounding box can be considered substantial. In addition, the processing associated with rotating the ray based on this data is not insubstantial. In an example, applying the rotation involves generating a rotation matrix, which is not a trivial operation and can involve performing sine and cosine operations, which are expensive, and performing matrix multiplication of a rotation matrix with the vector describing the ray, which is also not a trivial operation. With possible rotation in three dimensions, where the rotation in each dimension is represented with a number with a relatively large number of bits, such a matrix multiplication operation can be considered a substantial operation.

For at least the above reasons, techniques are disclosed herein whereby the orientation for oriented bounding boxes is quantized. That is, the number of ways in which a box node is able to be rotated is limited to a small set of possible orientations. The reduction in possible orientations as compared with an approach in which orientation is represented with a large amount of data such as 32 or 64 bits per dimension provides several benefits, such as reducing the amount of data that is required to be stored for the oriented bounding boxes and reducing the complexity of the hardware for applying the orientation of the oriented bounding box to the ray. The amount of data required to be stored is reduced as compared with an implementation that uses more orientation data because the reduced number of possible rotations can be represented with a smaller amount of data. In an example, the possible rotations are rotated by 45 degrees or not rotated, and this rotation can be applied in any of the three axes. In this scheme, one bit is used for the amount of rotation and one or two bits are used to specify which axis the rotation is applied to. The scheme that describes what possible orientations can be applied to a bounding box and how the associated data is stored is referred to herein as a quantization scheme.

A variety of implementations are possible in which different quantization schemes are in use. In some examples, a particular quantization scheme is defined as a set of possible orientations. Each such orientation represents a specific rotation or combination of rotations in one or more axes. In an example, each orientation is represented as a rotation matrix that indicates a degree of rotation in one or more axes. In one example, one rotation matrix indicates rotation of 45 degrees in one axis and 45 degrees in another axis, and another rotation matrix indicates no rotation in any axes.

In other examples, the quantization scheme is defined by the possible rotation values that can be applied individually to each axis of one or more axes. The number of bits available for the rotation values defines the number of possible rotation values, with each additional bit doubling the number of possible rotation values. For example, one bit would provide two possible rotation values (e.g., not rotated and rotated by 45 degrees), two bits would provide four possible rotation values, three bits would provide eight possible rotation values, and so on. In some examples, the possible rotation values are evenly distributed between no rotation and a maximum rotation. In some examples, the maximum rotation is 90 degrees. In an example, with four possible rotations, the possible rotations are zero degrees, 22.5 degrees, 45 degrees, and 67.5 degrees. In other examples, the possible rotation values are not evenly distributed between no rotation and a maximum rotation, but are distributed in some other, uneven manner.

Optionally, in addition to the bits defining possible rotation values, an additional set of one or more axis selection bits, defines which of one or more axes to apply the rotation to. In situations in which one rotation value is defined, the set of axis selection bits select one of the axes to which the rotation value is applied. In situations in which two or more rotation values are defined, the set of axis selection bits select which of two or more axes the two or more rotation values are applied to.

In some example quantization schemes, it is possible to apply rotation to more than one axis. In some such examples, where it is possible to omit the set of bits that specifies which axes the rotation is applied to. More specifically, in the situation that a set of bits is provided for each axis, the bits specifying which axis rotation is to be applied to can be omitted, since the axis with which each set of rotation bits corresponds to is implied. In one example quantization scheme, two sets of rotation bits are provided, one for each axis to which rotation is to be applied. Each such set of rotation bits specifies the degree of rotation for a different axis.

In sum, a wide variety of quantization schemes for quantizing the orientation of quantized bounding boxes are possible. Some quantization schemes include a number of possible pre-determined orientations, where each such orientation includes rotation in one or more axes. In such schemes, a number of orientation selection bits are provided for each oriented box node. The orientation selection bits for such a quantization scheme select one of the pre-determined orientations. The number of orientation selection bits for any particular box node is sufficient to allow for the possibility to select any of the orientations of the set of orientations in the quantization scheme. In an example, if eight different orientations are possible, then three orientation selection bits are used. In other example quantization schemes, the particular quantization scheme is defined by the number of axes for which rotation is specified, and the degree of quantization of the rotation. In some quantization schemes in which rotation in multiple axes is specified, it is possible for the axes that are rotatable to be fixed or it is possible for the axes to be selectable by a set of one or more axis identification bits. In examples where the axes are fixed, the axis identification bits identify which rotation bits indicate rotation for which axes. In some example bounding volume hierarchy builders 600, the bounding volume hierarchy builder 600 uses only one quantization scheme. Other bounding volume hierarchy builders 600 select which quantization scheme to use for a particular bounding volume hierarchy. Yet other bounding volume hierarchies 600 select which quantization scheme to use for each bounding box. The data for each such bounding box includes an indication of which quantization scheme to use, in addition to the data for the rotation itself.

Figure 6:
FIG. 6 illustrates a technique for introducing oriented bounding boxes with quantized rotations into a bounding volume hierarchy.

FIG. 6 illustrates techniques for generating a bounding volume hierarchy having oriented bounding boxes, according to an example. A bounding volume hierarchy builder 600 processes input data 602 to generate a bounding volume hierarchy with one or more oriented bounding boxes 604. In some examples, the input data 602 is a previously built bounding volume hierarchy with or without oriented bounding boxes. In other examples, the input data 602 is geometry such as triangles or other geometry from which the bounding volume hierarchy builder 600 builds the bounding volume hierarchy with one or more oriented bounding boxes 604. The oriented bounding boxes are quantized according to one or more quantization schemes as described elsewhere herein.

The bounding volume hierarchy builder 600 generates the bounding volume hierarchy with oriented bounding boxes 604 according to any technically feasible technique. In some examples, the bounding volume hierarchy builder 600 recursively subdivides the scene geometry to generate bounding boxes for the various levels of the hierarchy. For each such level, the bounding volume hierarchy builder 600 generates candidate subdivisions, where each such candidate subdivision represents a manner in which the volume being considered is divided into bounding boxes. The volume being considered is the volume bounded by the bounding box of the node for which children are being generated for the next level. In an example, the plane of x=0 divides the volume for the level into two volumes. All triangles to one side of the plane are assigned to one bounding box and all triangles to the other side of the plane are assigned to another bounding box. In some examples, other candidate subdivisions are created using the y=0 plane and the z=0 plane. Although an example with axis-aligned planes is described, it should be understood that the candidate subdivisions may be generated in any technically feasible manner. It should be noted that although these planes are used to generate the bounding boxes, the bounding boxes do not necessarily directly align with these planes. Instead, the bounding boxes bound the geometry within each subdivided volume. Thus in some examples, the bounding boxes are sized to the extents of the triangles enclosed within the bounding boxes.

In some examples, in addition to defining the candidate subdivisions based on geometric split, each candidate subdivision includes an orientation for each of the bounding boxes. The orientation specifies rotation along one or more of the axes, where the amount of the rotation is quantized as described elsewhere herein. Thus for any particular level, the bounding volume hierarchy builder 600 generates multiple candidate subdivisions for any particular geometric subdivision, where each such candidate subdivision has a different set of bounding box orientations. In an example, for the geometric subdivision in which the plane of x=0 divides the volume two bounding boxes are generated, one for each side of the plane. The bounding volume hierarchy builder 600 generates multiple candidate subdivisions, each of which has a different orientation applied to one or both of the bounding boxes generated.

The bounding volume hierarchy builder 600 selects a "best" candidate subdivision for each level, based on one or more selection criteria. The selection criteria is any technically feasible value or set of values. In some examples, the selection criteria is a measure of the total surface area of the bounding boxes in the candidate subdivision. A lower total surface area is considered "better" because a lower surface area is associated with a better fit to the internal geometry. Thus in some examples, the bounding volume hierarchy builder 600 selects a candidate subdivision having bounding boxes that have the lowest total surface area of all candidate subdivisions for that level. In some examples, the candidate subdivisions define orientation for each bounding box. Thus for a particular level, candidate subdivisions with different orientations are possible. It is notable that the reduced number of orientation possibilities associated with quantization allows for exhaustive consideration of all possible orientations, where such consideration would not be possible with arbitrary, high fidelity orientation. Although a specific technique has been described, any technically feasible technique for generating a bounding box may be used.

In examples where the bounding volume hierarchy builder 600 modifies an already existing bounding volume hierarchy to include oriented bounding boxes, the bounding volume hierarchy builder 600 does this modification according to any technically feasible technique. In one example, the bounding volume hierarchy 600 examines each level, determining whether any particular bounding box is to be converted to an oriented bounding box based on a trade-off between the benefit in doing such conversion as compared with the cost of making such a conversion. In some examples, the benefit is given a benefit score and the cost is given a cost score. In various examples, any technically suitable features are used to determine the benefit score and the cost score. In some examples, the benefit score characterizes the improvement in traversal performance provided by the oriented bounding boxes and the cost characterizes the reduction in performance resulting from the additional data storage and processing required by the oriented bounding box.

In various examples, the bounding volume hierarchy builder 600 is software or firmware executing on the processor 102 or within the APD 116, or is a hardware module (e.g., circuit) within the processor 102 or APD 116. The bounding volume hierarchy builder 600 is implementable in any technically feasible manner.

Figure 7:
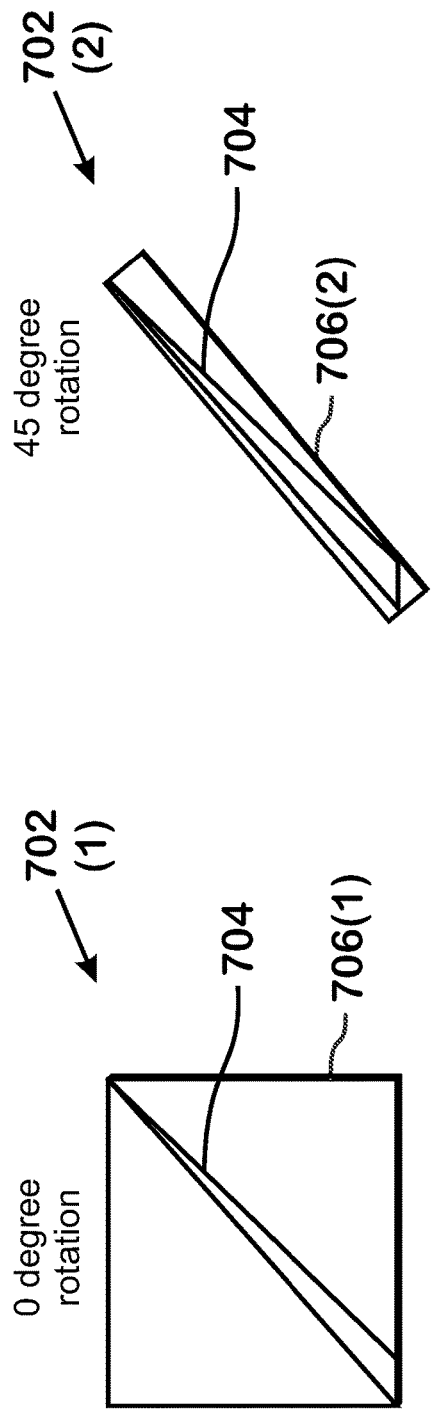
FIG. 7 illustrates example quantized rotations for a bounding box.
Figure 8:
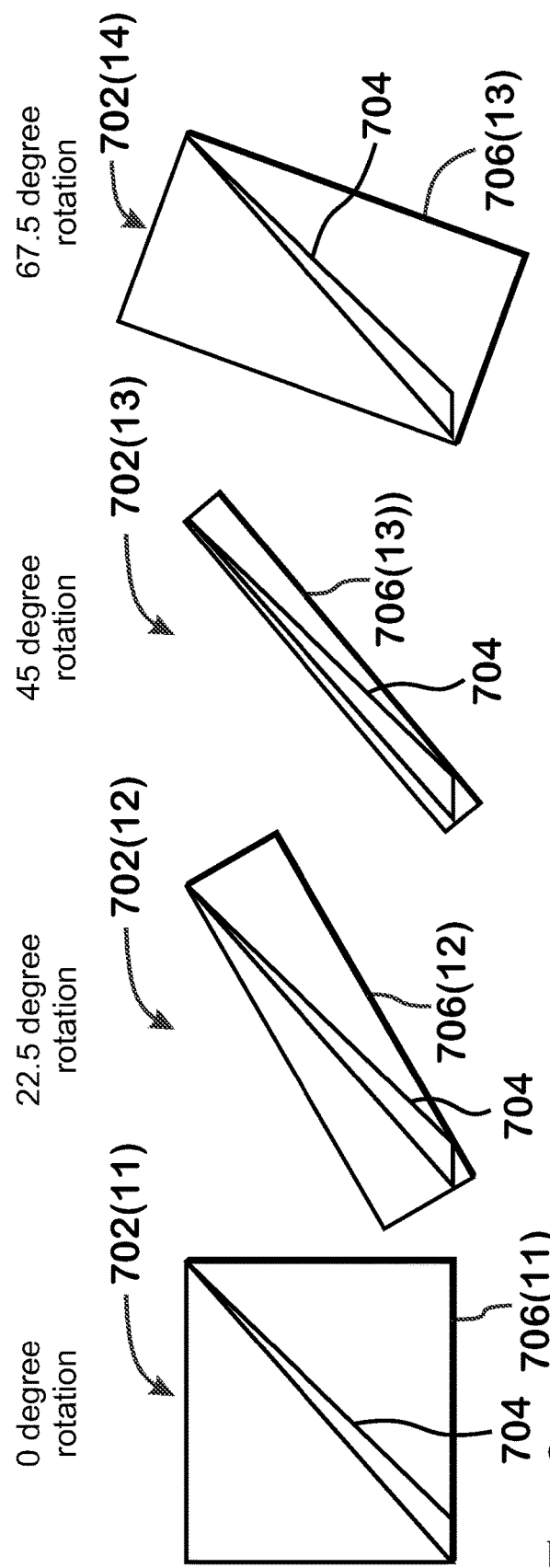
FIG. 8 illustrates another example of quantized rotations for a bounding box.

FIGS. 7 and 8 illustrate example aspects of quantization schemes for oriented bounding boxes. In these figures, rotation in only one axis is shown for simplicity, but it should be understood that the quantization schemes in which rotation in different axes is possible.

In FIG. 7, the angles of rotation that are possible are zero degrees and 45 degrees. In a first rotation 702(1), the bounding box 706(1) is rotated by 0 degrees. In a second rotation 702(2), the bounding box 706(2) is rotated by 45 degrees. Note that the bounding boxes are not the same shape because the bounding boxes 706 bound the underlying geometry (the triangle 704), and the 45 degree rotation causes a better fit than the 0 degree rotation. No other rotation is possible in this quantization scheme. Because only two rotations are possible in a given axis, the amount of data for storing rotation information in one axis can be limited to one bit. FIG. 7 illustrates rotation in only one axis, but it should be understood that quantization schemes are possible in which there are two possible rotation values, and where such rotation can be applied in one or more axis.

In FIG. 8, four rotations are possible: 0 degrees, 22.5 degrees, 45 degrees, and 67.5 degrees. In a first rotation 702(11), the bounding box 706(11) is rotated by 0 degrees. In a second rotation 702(12), the bounding box 706(12) is rotated by 22.5 degrees. In a third rotation 702(13), the bounding box 706(13) is rotated by 45 degrees. In a fourth rotation 702(14), the bounding box 706(14) is rotated by 67.5 degrees. The rotation of 45 degrees is illustrated as the best fit. Since only four rotations are possible per axis, only two bits are required to specify rotation for that axis. Again, it should be understood that various quantization schemes are possible, where rotation can be specified in one axis or more than one axis, and that in at least some such schemes, data indicating the rotation amount is provided, and in some quantization schemes, data indicating which axis the rotation is applied to. In other such schemes, a set of quantization selection bits selects a rotation matrix from a fixed set of rotation matrices, where each rotation matrix specifies rotation in one or more axis.

Figure 9:
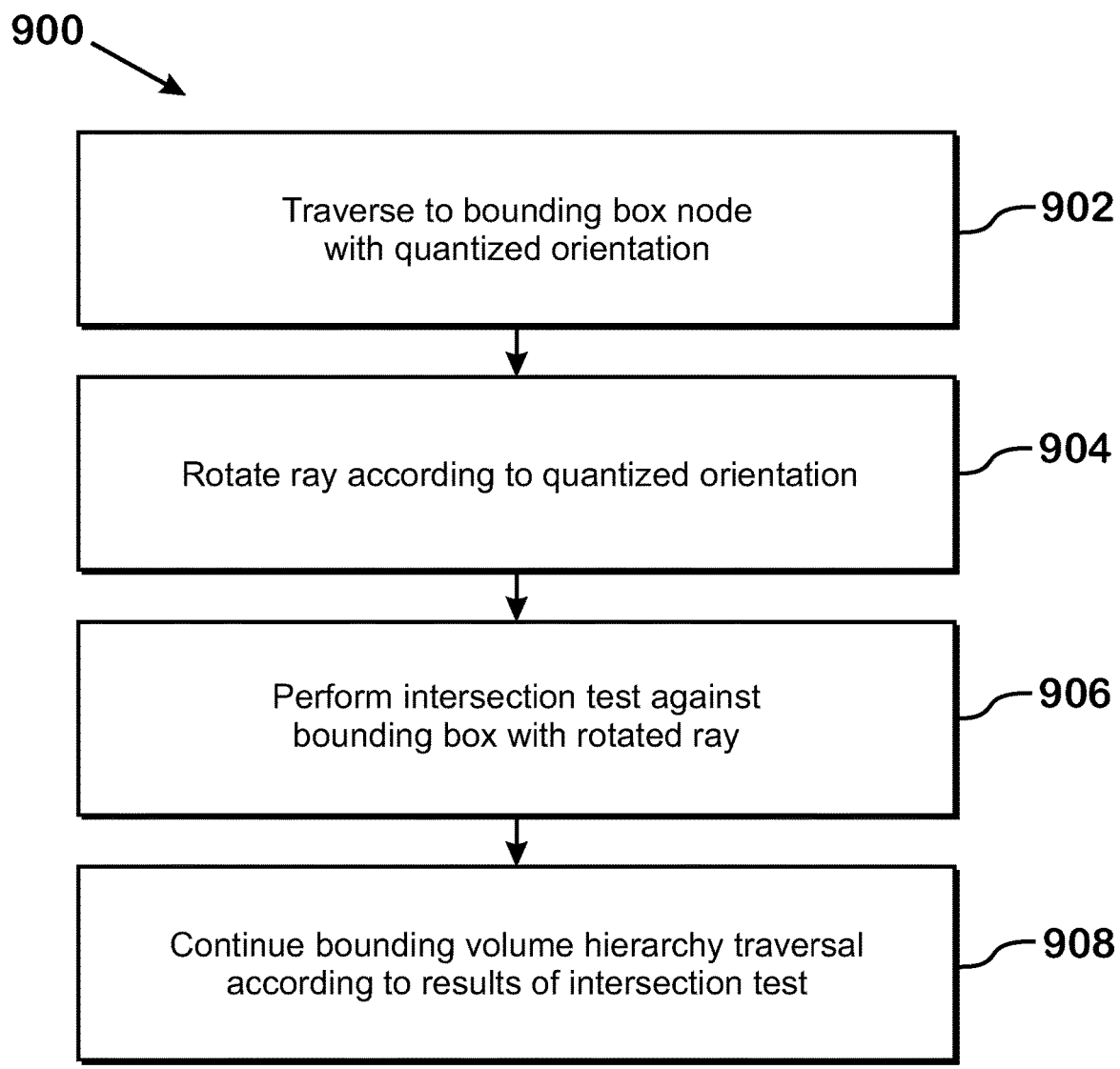
FIG. 9 is a flow diagram of a method for traversing a bounding volume hierarchy with quantized rotations, according to an example.

FIG. 9 is a flow diagram of a method 900 for performing ray tracing operations with a bounding volume hierarchy that has oriented bounding boxes with quantized orientation, according to an example. Although described with respect to the system of FIGS. 1-8, those of skill in the art will understand that any system configured to perform the steps of the method 900 in any technically feasible order falls within the scope of the present disclosure.

In some examples, the method 900 describes steps in the midst of traversal through the bounding volume hierarchy. In other words, in some examples, prior step 902, the acceleration structure traversal stage 304 has already traversed to and performed intersection tests for one or more of the nodes. In other examples, step 902 represents traversal of the first node (i.e., the base node) of a bounding volume hierarchy. Additional iterations of the method 900 are possible for traversal of an entire bounding volume hierarchy.

At step 902, the acceleration structure traversal stage 304 traverses to a bounding box node having a quantized orientation. The traversal occurs either by obtaining the first node of a bounding volume hierarchy or after determining that a parent bounding box node is intersected by the ray, which allows traversal to the node of step 902. At step 904, the acceleration structure traversal stage 304 obtains the orientation information for the bounding box node and rotates the ray according to the orientation information. The orientation information is quantized, meaning that the degree of rotation is greatly limited as compared with an arbitrary rotation that uses "normal-sized" values such as 32-bit or 64-bit floating point number to specify the amount of rotation. Any of the large number of quantization schemes described herein may be used. In addition, it is possible that a particular bounding box node specifies which quantization scheme is in use for that node or that the bounding volume hierarchy itself specifies which quantization scheme is used for the bounding volume hierarchy.

In some examples, rotation of the ray includes multiplying a vector describing the ray by a matrix that describes the rotation. In some examples, the fact that the orientation is quantized allows this multiplication to by implemented in hardware in a simpler manner than multiplication for arbitrary-valued rotation. For example, such multiplication involves multiplication by a relatively small number of constant values as well as multiplication by 1, which together is simpler than matrix multiplication with arbitrary floating point values.

At step 906, the acceleration structure traversal stage 304 performs the intersection test against the bounding box with the rotated ray. This test tests whether the ray ever enters the bounding box. Any technically feasible manner for performing this test is possible.

At step 908, the acceleration structure traversal stage 304 continues bounding volume hierarchy traversal according to the results of the intersection test. In the event that the ray intersects the bounding box, the acceleration structure traversal stage 304 performs additional operations (such as one or more additional iterations of the method 900) for the children of that bounding box. It should be understood that it is possible for any such children to have their own rotations, some of which may be quantized, meaning that the acceleration structure traversal stage 304 would apply such rotations to the ray for the intersection test for that particular child node. In the event that the ray does not intersect the bounding box, the acceleration structure traversal stage 304 eliminates the children of that bounding box from consideration, meaning that the acceleration structure traversal stage 304 does not test the ray against any such children.

The operating system 120, driver 122, and applications 126 are implementable as software executable on a processor, or as a combination of software and hardware (e.g., hard-wired circuitry). The graphics processing pipeline 134 is implemented as software, hardware, or a combination thereof. The compute units 132 are hardware processors. The scheduler is a programmable processor, software executing on a processor, hard-wired circuitry, or a combination thereof. The SIMD units 138 are programmable processors. Each stage of the ray tracing pipeline 300 is implementable as software, hardware (e.g., a circuit), or a combination thereof. A "processor" or "programmable processor" is a hardware circuit that performs operations described herein.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
    for a bounding box with quantized orientation, the bounding box being part of a box node of a bounding volume hierarchy, wherein the bounding box with quantized orientation is stored as a rotation of an axis aligned bounding box with respect to one or more axes, wherein the rotation includes a first set of bits that defines a rotation amount and a second set of bits that selects an axis for the rotation amount,
    performing an intersection test against the bounding box; and
    according to results of the intersection test, continuing traversal of the bounding volume hierarchy.

2. The method of claim 1, wherein the quantized orientation includes a selection of one rotation from a limited set of rotations.

3. The method of claim 2, wherein the limited set of rotations includes two rotations, four rotations, eight rotations, sixteen rotations, or thirty-two rotations.

4. The method of claim 2, wherein the quantized orientation includes a selection of one rotation from a limited set of rotations for each of two or more axes.

5. The method of claim 4, wherein the quantized orientation includes an indication of which axes the rotations are applied to.

6. The method of claim 1, wherein continuing traversal of the bounding volume hierarchy comprises:
    in response the intersection test indicating no intersection with the bounding box, eliminating children of the bounding box from consideration.

7. The method of claim 1, wherein continuing traversal of the bounding volume hierarchy comprises:
    in response the intersection test indicating no intersection with the bounding box, performing one or more intersection tests for one or more children of the bounding box.

8. The method of claim 1, wherein the bounding box includes an indication of a quantization scheme for the bounding box.

9. The method of claim 1, wherein the bounding volume hierarchy includes an indication of a quantization scheme for the bounding box.

10. A system comprising:
    a memory storing at least a portion of a bounding volume hierarchy; and
    a ray tracing pipeline configured to:
        for a bounding box with quantized orientation, the bounding box being part of a box node of the bounding volume hierarchy, wherein the bounding box with quantized orientation is stored as a rotation of an axis aligned bounding box with respect to one or more axes, wherein the rotation includes a first set of bits that defines a rotation amount and a second set of bits that selects an axis for the rotation amount,
        perform an intersection test against the bounding box; and
        according to results of the intersection test, continue traversal of the bounding volume hierarchy.

11. The system of claim 10, wherein the quantized orientation includes a selection of one rotation from a limited set of rotations.

12. The system of claim 11, wherein the limited set of rotations includes two rotations, four rotations, eight rotations, sixteen rotations, or thirty-two rotations.

13. The system of claim 11, wherein the quantized orientation includes a selection of one rotation from a limited set of rotations for each of two or more axes.

14. The system of claim 13, wherein the quantized orientation includes an indication of which axes the rotations are applied to.

15. The system of claim 10, wherein continuing traversal of the bounding volume hierarchy comprises:
    in response the intersection test indicating no intersection with the bounding box, eliminating children of the bounding box from consideration.

16. The system of claim 10, wherein continuing traversal of the bounding volume hierarchy comprises:
    in response the intersection test indicating no intersection with the bounding box, performing one or more intersection tests for one or more children of the bounding box.

17. The system of claim 10, wherein the bounding box includes an indication of a quantization scheme for the bounding box.

18. The system of claim 10, wherein the bounding volume hierarchy includes an indication of a quantization scheme for the bounding box.

19. A non-transitory computer-readable medium storing instructions that, when executed by a processor, cause the processor to:
    for a bounding box with quantized orientation, the bounding box being part of a box node of a bounding volume hierarchy, wherein the bounding box with quantized orientation is stored as a rotation of an axis aligned bounding box with respect to one or more axes, wherein the rotation includes a first set of bits that defines a rotation amount and a second set of bits that selects an axis for the rotation amount,
    performing an intersection test against the bounding box; and
    according to results of the intersection test, continuing traversal of the bounding volume hierarchy.

20. The non-transitory computer-readable medium of claim 19, wherein the quantized orientation includes a selection of one rotation from a limited set of rotations.

* * * * *